US011138831B2

(12) United States Patent
Marmarchi

(10) Patent No.: US 11,138,831 B2
(45) Date of Patent: Oct. 5, 2021

(54) METHOD AND APPARATUS FOR PLAYING POKER

(71) Applicant: Amir Hossein Marmarchi, Normal, IL (US)

(72) Inventor: Amir Hossein Marmarchi, Normal, IL (US)

( * ) Notice: Subject to any disclaimer, the term of this patent is extended or adjusted under 35 U.S.C. 154(b) by 730 days.

(21) Appl. No.: 15/654,336

(22) Filed: Jul. 19, 2017

(65) Prior Publication Data

US 2018/0025581 A1 Jan. 25, 2018

Related U.S. Application Data

(60) Provisional application No. 62/364,731, filed on Jul. 20, 2016.

(51) Int. Cl.
*G06F 17/00* (2019.01)
*G07F 17/32* (2006.01)
*A63F 1/00* (2006.01)

(52) U.S. Cl.
CPC ...... *G07F 17/3248* (2013.01); *G07F 17/3209* (2013.01); *G07F 17/3262* (2013.01); *G07F 17/3293* (2013.01); *A63F 2001/005* (2013.01)

(58) Field of Classification Search
CPC ............ G07F 17/3248; G07F 17/3209; G07F 17/3262; G07F 17/3293; A63F 2001/005
See application file for complete search history.

(56) References Cited

U.S. PATENT DOCUMENTS 7,794,324 B2 * 9/2010 White ..................... G07F 17/32 463/29
2005/0258597 A1 * 11/2005 Soltys ..................... A63F 1/06 273/274
2008/0153597 A1 * 6/2008 Oliveras ................. G07F 17/32 463/42
2008/0315521 A1 * 12/2008 Reabe, Jr. ............... A63F 1/00 273/292
2009/0124337 A1 * 5/2009 Lyons ..................... G07F 17/32 463/20
2009/0143141 A1 * 6/2009 Wells ..................... G07F 17/32 463/37
2016/0093168 A1 * 3/2016 Hall .................... G07F 17/3262 463/25
2017/0124810 A1 * 5/2017 Fraser ................. G07F 17/3293

* cited by examiner

*Primary Examiner* — Dmitry Suhol
*Assistant Examiner* — Carl V Larsen
(74) *Attorney, Agent, or Firm* — Benjamin D. Rotman; Golan Christie Taglia LLP

(57) ABSTRACT

A device, gaming machine and method for playing poker allowing players to hedge their risk by utilizing communication signals and or utilizing multiple stacks of chips wherein each stack of chips may serve a distinct purpose. A physical object or virtual object is used to signal to other players and/or dealers which part of a single stack or which particular stacks of chips are in play at any given moment in a particular hand and or what wager actions are available to players. There may also be additional preconditions, for example regarding in which streets of action, or with what size of what wager actions a signal can be played. The gaming machine embodies a virtual device and method allowing a player to hedge their risk utilizing communication signals and or utilizing multiple stacks of chips wherein each stack of chips may serve distinct purposes.

19 Claims, 12 Drawing Sheets

FIG. 13

| Status | Exposure Ranking (1=low exposure, 5=high exposure | Stack Exposure (Vulnerability) vs Protection (Hedging) | Activeness Ranking (1=low activeness, 5=high activeness | Stack Activeness vs Passiveness |
|---|---|---|---|---|
| Red | 1 | Absolute minimum/zero exposure (maximum protection), as a red stack becomes totally inaccessible and excluded from the action, as if that stack doesn't exist anymore for the rest of the hand. | 1 | Extremely passive as a red stack can't be used in any action. |
| Green | 3 | Moderate exposure, as on one hand a green stack can no longer seek the red maximal protection, (although green is non-terminal, it can't turn to red), but on other hand fold remains an option that can save the stack. | 4 | Active, as a green stack can be used in both active actions (bet, raise), and passive actions (check, call). |
| Yellow | 3 | Moderate exposure, just like the green, yellow can't turn to red (because yellow is terminal), and fold remains an option. | 3 | Passive, as a yellow stack can be used only in passive actions (check, call) or player can fold, but can't be used in active actions (bet or raise). |
| Orange | 2 | Slight exposure, an orange stack exposure is between red and yellow, as on one hand it can either stay orange or turn to yellow (both options maintain moderate exposure), on the other hand, it can turn to zero exposure red. | 2 | Very passive, orange may stay orange or turn to yellow, both options allowing only passive actions, or it can turn to red which allows no action. |
| Black | 5 | Maximum exposure as black makes the stack un-foldable, meaning that as long as there are chips left in the black stack, player can't fold, and black stack has to remain involved in any action for the rest of the hand. | 5 | Extremely active, player can do all actions, plus if facing a bet, he <u>must</u> at least call (or raise) as long as he has any chips left in his black stack. |

A sample of the physical appearances of the front (left hand side) and back (right hand side) of different signals. While the following signals are displayed for the stack number 2, similar designs can be used for any other stack.

| Front | Back |
| --- | --- |
| Stack 2 Green Signal<br>May play stack 2 green signal with any action if:<br>*Some chips remain in stack 2 after current action | Aftermath of playing stack 2 green signal:<br>*Stack 2 merges with stack 1 and work as one stack so long as the status remains green |
| Stack 2 Red Signal<br>May play stack 2 red signal with any action if:<br>*Some chips remain in stack 2 after current action<br>**No chips remain in stack 1 after current action | Aftermath of playing stack 2 red signal:<br>*Stack 2 become inaccesible for the rest of the hand |
| Stack 2 Yellow Signal<br>May play stack 2 yellow signal with any action if:<br>*Some chips remain in stack 2 after current action | Aftermath of playing stack 2 yellow signal:<br>*Stack 2 can't be used in bet or raise actions for the rest of the hand |
| Stack 2 Orange Signal<br>May play stack 2 orange signal with any action if:<br>*Some chips remain in stack 2 after current action | Aftermath of playing stack 2 orange signal:<br>*Stack 2 can't be used in bet or raise actions so long as status remains orange |
| Stack 2 Black Signal<br>May play stack 2 black signal with any action if:<br>*Some chips remain in stack 2 after current action | Aftermath of playing stack 2 black signal:<br>*In the rest of the hand, fold is not an option as long as there are any chips remained in the stack 2 |

FIG. 14

FIG. 15

| |
|---|
| **Figure 15: How a player may play his signals (of his 2nd stack) in a double stack R.O.G.B.Y. (Red, Orange, Green, Black, Yellow) game?**<br>Assuming this player has chosen to play with both primary stack (called chip stack) and secondary stack (called dip stack) |
| **How a player may play his signals (of his 2nd stack) in a double stack R.G (Red,Green) game?**<br>Assuming this player has chosen to play with both primary stack (called chip stack) and secondary stack (called dip stack) |

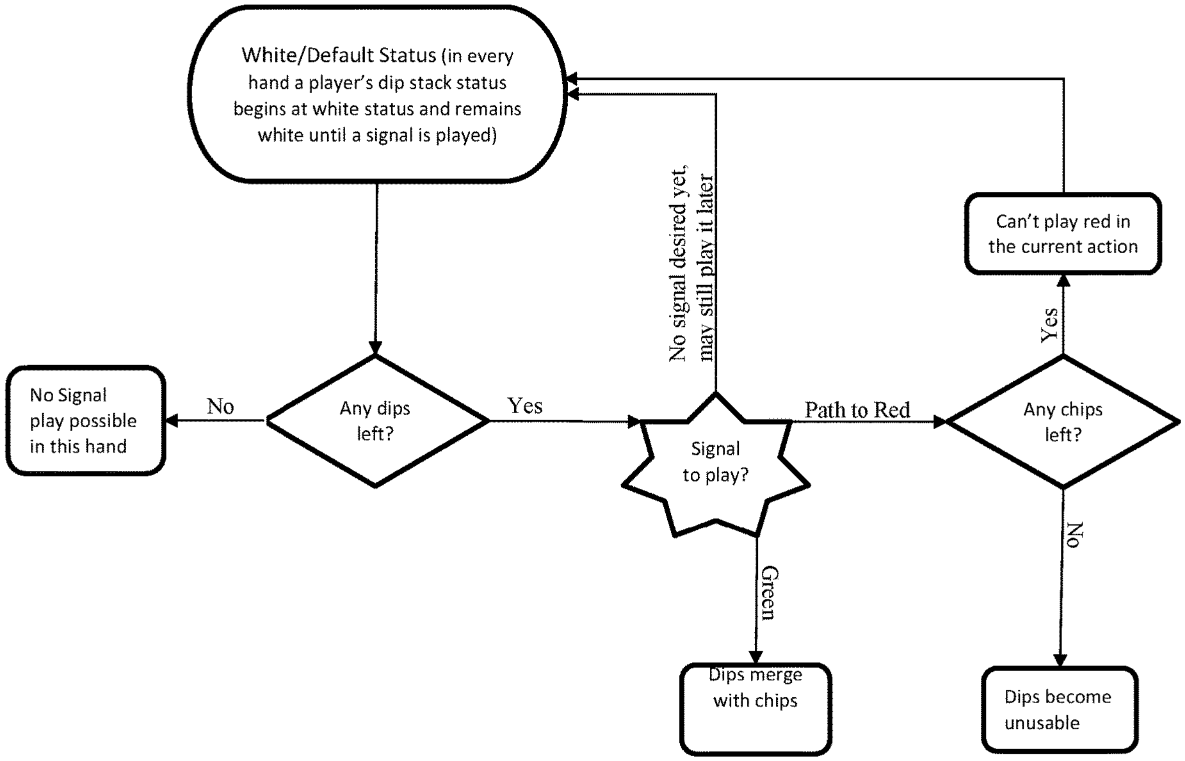

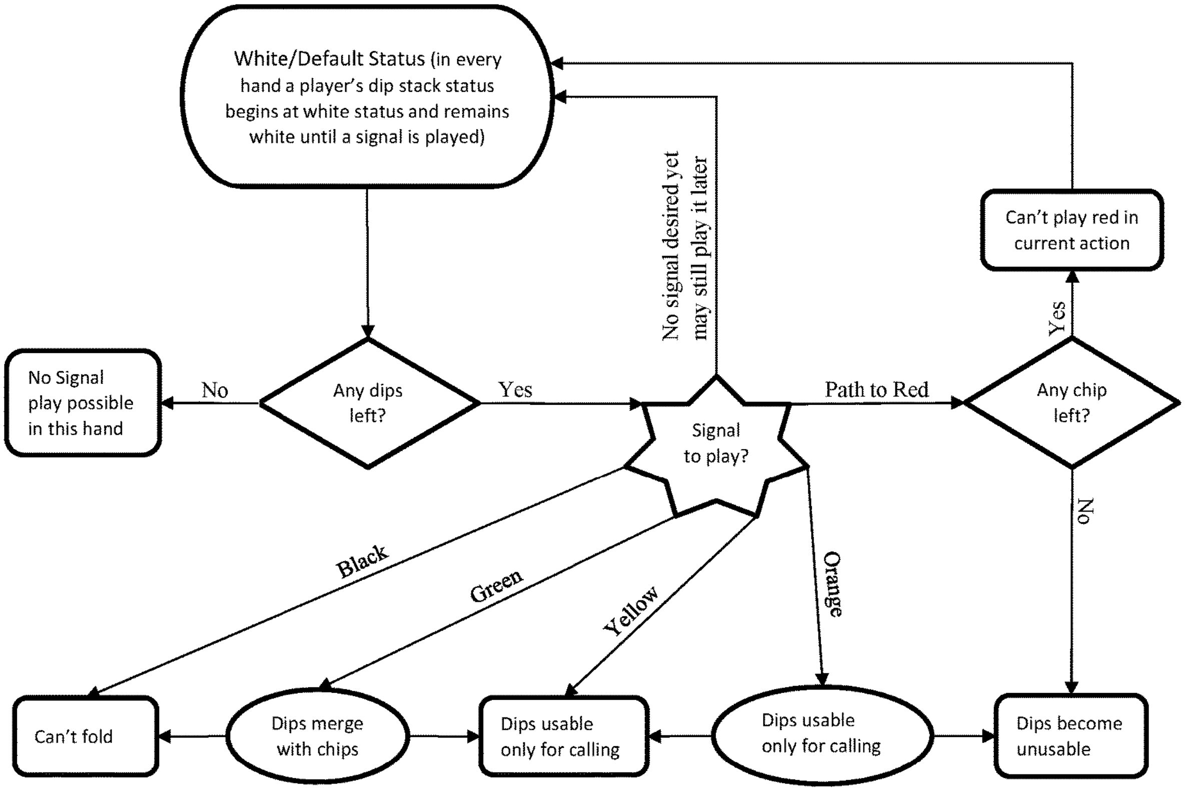

Black, Yellow, and Red are terminal statuses, meaning that once a player played any of these 3 signals, his dip stack status/signal can't change for the rest of that hand.

Green is non-terminal in R.O.G.B.Y game as it may stay Green or may turn to Black or Yellow statuses later in that hand.

Orange is non-terminal in R.O.G.B.Y game as it may stay Orange or may turn to Red or Yellow statuses later in that hand.

FIG. 16

METHOD AND APPARATUS FOR PLAYING POKER

CROSS-REFERENCE TO RELATED APPLICATIONS

This application claims the benefit of priority to U.S. Provisional Patent Application Ser. No. 62/364,731, filed Jul. 20, 2016, which is incorporated by reference herein.

BACKGROUND OF THE INVENTION

Different variants of poker use poker chips to allow players to make wagers based on the hand they are dealt. Poker chips have a numerical value and the value of each chip is typically discerned by the player based on the color, pattern, or number on the chip. Due to the size and shape of the typical poker chip, players tend to stack their chips in front of themselves on the poker table. The stack of chips allows the player to organize their chips and also allows other players at the table to evaluate their position in the game relative to the other players.

Traditionally, stacks of poker chips have been used as organizational tools for players rather than having particular in game purpose. In some examples, however, multiple stacks have been utilized as part of the in game experience. For example, the multi-action poker game contemplated by U.S. Pat. No. 8,936,246 (Frazin) uses two distinct stacks of chips. Frazin's use of two stacks of chips is based on a poker variation that deals two independent poker hands each dedicated to a different game, played simultaneously so each stack is dedicated to one of these independent games.

Another example of the use of multiple poker stacks is that in some tournament structures, players may receive their initial stack in the form of two or more separable stacks and then the players can choose to use those stacks all at once or bring the stacks into the game one by one at later stages of the game. In both of the examples mentioned, multiple stacks are not in play at the same time in the same game, if the stacks are used at the same time, then they work as one functional stack and the stacks neither visually nor functionally have any difference. In those examples therefore, the game plays like a single stack game.

In the present invention, it is possible to play poker with multiple stacks in which a single game can be played with a primary stack of chips plus additional higher number orders of stacks of chips that may be distinguishable visually or functionally, plus a signaling device that is meant to communicate the functionality status of stacks of players to other players and dealers. It is also possible for players to start with a single stack, and then use their signaling devices with or without certain preconditions as the game progresses, to differentiate the functioning of all or part of the remaining chips in their starting stack, which is tantamount to creating multiple stacks of chips with distinct functions out of a single starting stack.

SUMMARY OF THE INVENTION

The present invention is a device and method for playing poker allowing a player to hedge their risk and manipulate the degrees of exposure of each of their stacks by utilizing physical or virtual communication signals and utilizing multiple stacks of chips wherein each stack of chips may serve distinct purposes at different times during a hand of cards.

In one embodiment of the invention a physical or virtual object or signal device is used by a player to signal to other players and dealers whether any particular stack of chips belonging to that player is in play, and more specifically how is it in play; that is whether the player has the ability to utilize any of the following wagering actions including but not limited to betting, folding, checking, calling, or raising at any given moment in a particular hand with a particular stack of chips. In other types of signals, when a player plays a signal the player may affect multiple stacks of the player, or the player may affect one or more stacks of other players, or the player may prevent and block other players from playing certain signals or he may nullify certain signals that other players may have already played.

In a general game of poker, all chips on the table can be used by their respective owners to place wagers within the game. In the method presented, players may divide their poker chips into separate chip stacks and either use all of their chips to make wagers in each hand, or only use chips from a designated stack to make wagers, by playing certain signals, players may also limit the set of available wagering actions. A physical signal, signal device, or virtual signal can be used to indicate which stacks a player has in play and what wager actions are available for the stacks that are in play.

The present invention allows players to manage their judgmental overconfidence and hedge their risks while playing poker by limiting wager options while allowing players to move forward with the dealt hand. Players play with at least one independent stack of chips. The player may have a number of distinct signals for each of his stacks that he can use at the beginning of the hand or during the hand before the player makes a wager action to indicate what wager actions, if any, will be available thereafter in that hand for him to do with each particular stack. The signals may also be associated with players instead of being associated with each stack of a player, hence limiting the actions that a player can do with all his stacks. Different category of signals may also be designed to affect other players including or excluding the player who plays the signal. Another category of signals can be used to affect (e.g block or nullify) other signals instead of affecting the possible plays with chips. Signals may be used in either an unlimited and repeatable fashion or a player may have a limited number of opportunities to play each signal. Signals may have monetary value associated with them, meaning that players need to pay to buy them or they may have no monetary value associated with them. At the end of each hand, played signals if any, may be distributed in different ways, for example a played signal may be returned to the player who played it, or to the dealer, or to the winner of that hand.

The occasion of playing a signal can be at some or all of the same times that a player makes an action with his chips (e.g. bet, check, call, raise) in some or all of the standard streets of action, like preflop, flop, turn, and river, or any additional streets of action, or alternatively new streets of action can be added to the signal poker game, during which only signal play can be done. For example one variety of signal poker can be designed such that players have another street of action called "overflop" after the flop and before the turn, in which only signals and not chips can be played. Furthermore, the opportunity of playing signals can be limited to some streets of action, for example signals may be allowed to be played only on the flop and the turn, or certain signals for example the red signal can be played only after the flop and or only with a certain size of bet or raise, like minimum $200 bet or raise, or 50 big blinds raise, or a minimum pot size bet. Playing some or all signals can be done as optional or mandatory, with or without conditions on when and how to play each signal.

An additional embodiment of the present invention relates to a gaming machine system comprising a housing and computing components such as a power supply, microprocessor, memory, storage, an electronic display and external connectivity such as but not limited to Wi-Fi, Ethernet, or cellular modem connectivity and an electronic input device such as an input controller like a touch screen or physical buttons. The gaming machine is configured to receive a physical input from a player to initiate the card-based wagering game and transform the input into an electronic data signal. The electronic data signal is processed by the gaming machine and returns a randomly generated hand as a visual indicator to the display as well as randomly generated hands of additional networked players, or artificial players. The player may then wager according to the signal method described above and below and use a visual signal or virtual signals in place of physical signals.

In an additional embodiment, the player may arrange the chips into stacks that represent wager actions. In this embodiment, the player for example may sort a set of chips into a "call only" stack, or an "initial bet" or "raise stack." In this embodiment, the players wagering actions may be limited by the chips available in a particular wagering action stack.

The signal method can be applied to any game of poker whether the game is played live or online, cash game or tournament with or without reentry option, heads up (two players) or any number of players, regardless of the limit structure (no limit, pot limit, spread limit, limit, . . . ), whether the game is played high, low, or any version of split hi-lo, whether the game is played between individual players or between teams of players, whether players play one game or simultaneous games, and whether the game is played with standard 52 cards decks or any other modified decks of cards, regardless of the ranking of hands (e.g. flush beats straight, etc.), and regardless of the number of streets of action (e.g. 4 streets as in the standard Texas hold'em game including preflop, flop, turn, river or less or more than 4 streets of actions), whether the game is a draw poker, stud poker or any other format, and whether one specific game is played or there are mixed games that may or may not be played round by round.

A person of skill in the art would understand that, in some instances, the terms "wager" and "bet" be used in an interchangeable fashion. The term wager is intended in its broadest meaning to refer to any physical or virtual movement of chips from a player's stack to the pot, regardless of whether such movement of chips and contribution to the pot is being done during a "call", a "bet", or a "raise". A "raise" is also intended in its broadest meaning, and refers to both a "raise", and a "re-raise". Wherever the term "dips" have been used as opposed to "chips", the latter is intended to refer to the "chips of the primary stack", while the former refers to the "chips of the secondary stack".

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 13 is a table diagram representing an strategic implications using various signals during a poker game.

FIG. 14 is an additional diagram representing an alternate method of designing some different signals for a poker game.

FIG. 15 is an additional diagram representing an alternate method of using two specific signals during a poker game.

FIG. 16 is an additional diagram representing an alternate method of using five specific signals during a poker game.

DETAILED DESCRIPTION OF THE PREFERRED EMBODIMENTS

Figure 1A:
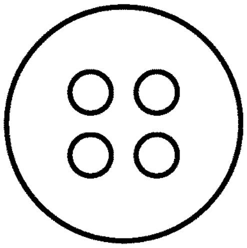
FIGS. 1A and 1B are representations of physical embodiments of the signal.

The Role of "Signal" in "Signal" Games

Poker signals are physical objects or indicators in live games or representations of physical objects or indicators in online games. In one embodiment of signals, referred to as "private single stack" signals, each signal is associated with a certain stack of chips of a certain player, each stack of chips its own set of discrete signals identifying wagering actions for that particular stack. Each signal communicates to other players a different set of limitations that the player self-imposes in terms of how the player can use the stack associated with that played signal.

In one embodiment, players may play with one stack and one signal for that stack. In additional embodiments however, there is no maximum number of stacks nor is there a maximum number of signals that may be associated with each stack. For example, one signal poker embodiment can be played with one stack that comes with 5 signals representing 5 wagering actions, or another signal poker embodiment can be played with 2 stacks where stack 1 comes with 2 signals representing 2 wagering actions and stack 2 comes with 6 signals representing 6 wagering actions. An additional embodiment of signal poker can be played with four stacks where stacks 1, 2, 3, and 4 respectively come with zero, 2, 5, and 3 signals. Not every player on the same signal poker table necessarily has to opt for the same number of stacks or the same number of signals on each stack. What each embodiment in this example holds common is that the wagering action available for each particular stack, whether played with 1 stack or an infinite number of stacks is controlled by the number of signals each stack has available, and what signal is displayed at a given moment for the respective stack.

Signals allow a player to communicate to other players and dealers information about which of the player's chip stacks and under what constraints (or limitations over available choices of action) "wagering actions" the player may wager in any particular stage of a hand. A player who intends to play a particular signal associated with a particular stack can do so by displaying a signal of the player's intended chip stack such that all players and dealers can see it properly. In virtual games this may be implemented by means of clicking on a button associated with a particular signal which results in other players seeing that signal being played or activated by that player.

Each hand of a signal game may start with no signal of any player being played while players may be capable of playing their signals later on during the hand in some or all streets of action. Alternatively, players may have the option to play their signals even before the cards are dealt or the hand begins, or there can be arrangements that certain signals of certain stacks may be mandatorily played for some period or the whole period of the game.

Representation of Signals

Each signal may be embodied by a distinct physical object like a flat button in live games or a representation of physical objects in online games. For example if a live signal poker variant utilizes 6 signals, the signals may be embodied by 6 unique signal objects like 6 different flat buttons.

In an additional embodiment, it is also possible to use one single object to represent multiple different signals; so in the aforementioned example, the 6 signal objects can be replaced with one single signal object like a cube with 6 sides. When instead of using multiple objects the single object approach is adopted, each side of the multi-faceted signal object can represent a different signal and hence in such a multi-faceted signal object, a signal is referred to one side of an object and not the whole object. A different form of multifaceted signals can also be used in which on each face of the multi-faceted signal object, the number of stacks in play are written or embossed. The number of signals theoretically can be unlimited. Each signal can be represented by a number, a color coding, or other graphical or verbal demonstrations or any combination of these.

When a player intends to play a signal, the player does so by placing the signal in front, around the betting line or in some embodiments turning on an indicator light of a particular color representing a signal. Therefore absence of any signal in front of a player indicates that the player has not played any signal yet. The absence of a signal in some embodiments may be the default status of a player.

Figure 1B:
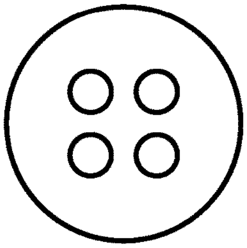

In one embodiment of the signal poker game includes a variation where the signals only indicate which stacks are actually in play as opposed to the available wagering actions. A single button with no distinct design on either side, each side represented by FIG. 1A and FIG. 1B respectively, for example, may be the embodiment of a signal in a game with two signals.

Figure 2A:
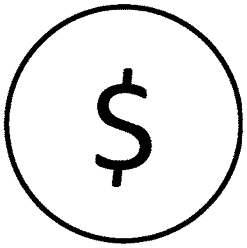
FIGS. 2A and 2B are representations of physical embodiments of the signal.
Figure 2B:
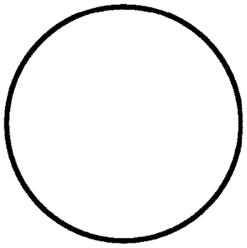

Another example could be the use of a two sided coin as represented with a distinct design or color on each side, each side represented by FIG. 2A and FIG. 2B respectively, for a game with three stacks. If all the stacks are in play, the coin or signal is not present on the table. If only one of the stacks is in play, the coin may be present on the table turned to side A, whereas only two of the stacks are in play if the coin is turned to side B.

Figure 3:
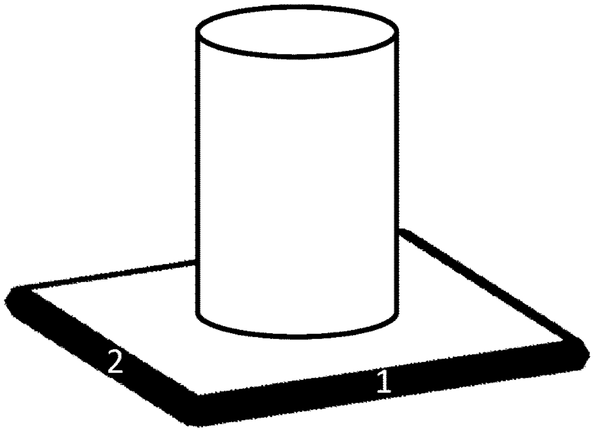
FIG. 3 is a representation of a physical embodiment of the signal.

An additional embodiment of a signal may be identified as a standard polygonal drink coaster as represented by FIG. 3 wherein each facet indicates how many stacks are in play for a particular hand. The example in FIG. 3 shows a number written on each side of the coaster, and in this example, the number that is facing the dealer indicates the number of stacks in play. In other embodiments, the number or side may also represent a signal to be played as opposed to the number of stacks in play.

Figure 4:
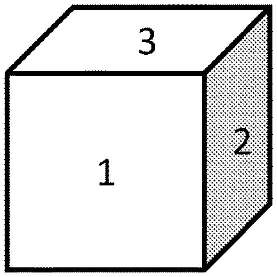
FIG. 4 is a representation of a physical embodiment of the signal.

An additional embodiment may be a multifaceted object such as a cube as represented in FIG. 4 wherein the number of facets indicates how many stacks are in play for a particular hand.

Figure 5A:
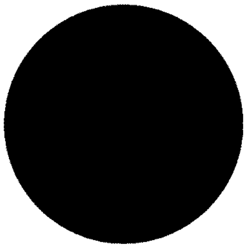
FIGS. 5A and 5B are representations of physical embodiments of the signal.
Figure 5B:
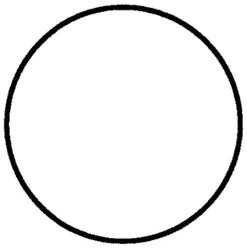

One embodiment as further described below comprises a system of signal poker, where each signal is represented by a distinct object or visualization. Instead of having each face of a single signal object representing each mode, single objects can be adopted to represent each signal. For example, as represented in FIG. 5A and FIG. 5B, instead of a button with two distinct sides of green and red for the two possible signals, two different single color signal objects can be used, one object in red color and a second object in green color. Or instead of using a single cube with 6 different signals on each of the six faces, we can have 6 different single mode signal objects.

In another embodiment the signal may be a device or a virtual representation of a device with multiple colored lights such as a box with a power source and an embedded multicolored LED and switch. The user may use a switch or a software selection option to change the color of the LED. Each color light represents a different signal for an individual stack. Each stack may have its own device, but additionally the device may be built to have multiple light indicators to represent multiple stacks. It is understood that a person of skill in the art may use any type of light or colored light filter in the device, or any type of multi-status indicator to represent the plurality of discrete signals.

The Distinction Between Signals of Different Stacks of Each Player:

The signals of different stacks should be distinguishable such that players can ascertain exactly which stacks and with which constraints are in play. Some of the examples of such distinctions include the size, shape, numerical coding, and relative location of the signal objects. A game operator may also choose different and specific styles of signal objects, allowing player to choose a set of signals based on personal preferences.

Terminal or Non-Terminal Signals

Some signals are considered "terminal" signals. This means that once a terminal signal is played by a player, that signal cannot be taken back or changed either for the rest of that hand, for a certain period of the game or for the whole period of the game. When playing non-terminal signals however, the signal may be taken back or changed to other terminal or non-terminal signals based on the player's strategy. For example, a player may have the option to retract his non-terminal "orange" signal and play the terminal "yellow" signal instead, but the player cannot switch "yellow" signal to any other signal as the "yellow" is a terminal signal. Some signals may be considered terminal in games with certain other signals being available and nonterminal with others. For example, the "green" signal may be considered terminal in one embodiment of a 2 signal game with only "red" and "green" as "green" cannot turn to "red", but in another embodiment of a 6 signal game, "green" can be non-terminal as it can be turned to other signals like "black" or "yellow".

While in some signal poker varieties, some or all signals may be optional to play and playable without any condition; in other signal poker varieties, playing some or all signals may become possible or impossible if certain conditions have happened, or playing some or all signals may become mandatory if certain conditions happen. As an example of a mandatory condition for playing signals, if in a 4 stack game, a player plays the red signal of his second stack, playing the red signals of higher order stacks (stacks 3 and 4) may be defined as mandatory. Or as an example of a condition that needs to be met before a signal can be played, the red signal of a higher order stack can be played only if all the lower order stacks have been completely wagered or are being wagered.

Signal Varieties

Each stack is governed by wagering actions further described below. A particular wager action chosen by a player can be represented by a plurality of discrete signals emanating a signaling device. Each stack can have multiple discrete signals which may be differentiated by color coding but may also be differentiated by other means like size, shape, or verbal explanation, etc. While the number of signals for each stack is theoretically unlimited, the game operator may adopt a limited number of signals. The following is a non-exhaustive list of wager action limitations that may be instituted by a player:

a. the stack is out of play;
b. the stack is in play and cannot be made out of play;
c. the chips in the stack are usable only for a call action and cannot be used for a bet or a raise action;
d. the player commits not fold the dealt hand;
e. the player commits not to check;
f. the chips in the stack are usable only for a call or a raise, but unusable for betting;
g. the chips in a stack are usable only for a call or a bet, but unusable for raising;
h. the player commits to bet if the wager action is checked to the player, or raise if the player faces a bet;
i. the player can only bet or raise;
j. the player can use the stack only for betting;
k. the player can use the stack only for raising;
l. a default mode before any other signal is played signifying that all actions are still possible using the stack;
m. the player remains in the dealt hand by wagering less than a current table wager and without making any additional wagers throughout a remainder of the dealt hand.
n. the player blocks at least one additional player from playing a wager action; and or at least one signal; and
o. the player cancels at least one wager action limitation from at least one additional player.

A person of ordinary skill in the art would understand that the use of colors to describe discrete signals is an example, and that any suitable designation may be substituted for the colors. Below is a non-exhaustive list of example wager actions represented by color signals and a brief description of their meaning, followed by detailed descriptions of some of the signals.

I) Red signal: Makes a stack out of play
II) Green signal: Removes the possibility of playing the Red signal, hence keeping that stack in play.
III) Yellow Signal: Makes the chips in a stack usable only for a call action, i.e. making those chips unusable for any bet or raise action.
IV) Black Signal: As long there are chips left in a stack for which a black signal has been played, the player will be committed to not fold his hand.
V) Double Black Signal: The player who plays the double black signal can't fold.
VI) Purple Signal: As long there are chips left in a stack for which a purple signal has been played, the player will be committed to not check, i.e. he can only fold his hand, or bet or raise using that stack.
VII) Double Purple Signal: The player who plays the double purple signal can't check.
VIII) Pink Signal: Makes the chips in a stack usable only for call or raise, but unusable for betting.
IX) Brown Signal: Makes the chips in a stack usable only for call or bet, but unusable for raising.
X) Grey Signal: As long there are chips left in a stack for which a grey signal has been played, the player will be committed to bet if the action is checked to him, or raise if he faces a bet.
XI) Double Grey Signal: The player who plays the double grey signal can only bet or raise.
XII) Blue Signal: The player who plays the blue signal can use the associated stack only for betting.
XIII) Silver Signal: The player who plays the blue signal can use the associated stack only for raising.
XIV) White Signal: The default mode before any other signal is played, hence all actions are still possible using that stack.
XV) Plaid Red Signal: the player remains in the dealt hand by wagering less than a current table wager and without making any additional wagers throughout a remainder of the dealt hand.

The Default Signal:

In one embodiment, the default signal represents the initial situation where the players have not played any of their other (non-default) signals yet. While many different signals may be used as the default/initial signal at the beginning of each hand or at the beginning of some or whole period of a game, the default signal in this embodiment of the signal poker is the "white" signal. The "white" signal is a non-terminal signal which like the "green" signal imposes no limitations on the set of actions that the player can choose, but unlike the "green", the "white" signal can turn to any other signal.

If adopted, the white/default signal can be implemented in different ways. One method of implementing the white/default signal is communicated by the absence of any signals. In that case the game starts with no signal played and the player's stack is considered in the white/default signal until a non-default signal is played in the upcoming rounds of action by the player. Alternatively separate white signal objects in multi object signals or a white side of a multi-faceted signal object can be used to represent the white signal. So long as the signal of a stack is still white/default, all options are still available to the player in terms of how the player can use the stack associated with that signal in any future round of action.

Signals Organization

Other than the default signals, as indicated above, there can be a number of other signals that can be used for each stack of chips. A signal poker game can be played with single, double, triple or higher number of stacks, and with any number of signals for each stack. For example a game operator can adopt a single stack game with red signal only where the red signal can be played only after the flop, and only with a minimum of 50 big blinds bet or raise. Another example can be a triple stack signal poker variety in which the first stack comes with no signals, the second stack comes with five signals and the third stack comes with four signals.

Because each signal can be considered a tool to communicate to other players a set of constraints defined over the wagering options of player, there can be unlimited numbers of combinations of constraints to define over at least one stack of chips of at least one player and therefore it is possible to design an unlimited number of signals. While the number of potential signals that can be designed and used is not limited, in the interest of brevity, this document explains five basic versions of five signal examples in more details (these five signals are referred to as "green", "red", "yellow", "orange", "black") in addition to the already discussed "white" signal. Obviously, a game operator will have the choice to use different varieties of any number of these five signals with or without other signals that can be designed similar to the way these five signals are designed and explained in this document.

One embodiment of a signal poker game utilizes only one signal for a stack. This single signal can be implemented by a physical object like a flat button. For example if a single signal game with only red signals is intended, a red flat button can be used as the red signal.

Another embodiment of a signal poker game can use two different signals, for example red and green signals. In that case in a live game, the game operator can either adopt separate red and green objects or instead they can use a two sided object with green color on one side and red color on the other.

When "n" signals are intended, in a live casino the signals can be implemented either by "n" separate objects, one object for each signal, or by using a multi-faceted object that may have "n" sides that embodies multiple signals, one signal on each side of the signal object.

If "n" number of signals is intended to be used in an online casino, the signal indicator must have "n" statuses, like "n" different indicators or lights or one indicator/light that can turn to "n" different colors or statuses. The signals in online game can also be represented with verbal, numerical, or graphical indicators or any other method that can communicate to players the signals played by each player.

Distinction Between the Chips of Different Stacks (in Multi-Stack Signal Games)

The distinction between the stacks is both functional and visual. The visual distinction between primary stack and additional stack(s) can be done in different ways, such as: chip color, chip denomination, chip shape, chip thickness, chip location, holding or separating devices for chips, or a system to visually distinguish chip stacks from one another.

Stack Size Determination (Dividing Stacks and Transferring Chips Between Stacks)

In signal poker, dividing a stack into two or more stacks or converting chips from one stack to the other can be done in different ways. In one embodiment, the division of stacks or conversion between stacks has to be done in advance, i.e. prior to the beginning of a new hand. This is to make sure that before a hand starts, all players know the sizes of each stack of each player. In another embodiment, players can divide their stacks to separate stacks or converts chips between their already separated stacks at some or all times during the hand with or without conditions, or while playing certain signals. Splitting, or merging the stacks or moving chips between stacks may also be mandatory under certain conditions or they may be impossible after a player has already started the game.

There can also be limitations and conditions on the times that merging, splitting or chips movements between stacks can be done (e.g. movement possible on certain streets of action like the turn or during certain levels or certain breaks of a tournament). Other conditions can be enforced on the amount of chips that can be moved, the relative and absolute stack sizes, the number of times chips can be moved, movement possible only from some stacks to the others, or only while or after playing certain signals. Such conditions are discussed below.

Playing the Signal

Each player at the beginning of the game receives distinguishable sets of signals. When not played, the signals can be kept behind, on the side, or under the chip stacks, but when played they should be placed on the table in a place visible to all players, for example on or beyond the betting line in front of the player who is playing them. In live games if one object is used for each signal, the player can simply place the object on the table, but when one signal object is used for all signals together, the player should place the signal object with the intended side of the signal facing up. The upside face indicates the intention of the player playing the signal which can be to obligate himself or other players to play certain stacks with certain constraints.

Reusable Vs Non-Reusable Signals

In some embodiments of the signal poker, the signals can be played in an unlimited number of times by each player, therefore in such embodiments, the player who has played a signal, may take back the signal that he has used and reuse it in future rounds of actions or future hands. In other embodiments of the signal poker, however, the number of times that certain signals can be played may be limited. For example, during a whole game session, some tournament levels, or for certain periods of the game, a player may be allowed to play the red signal only four times, in that case, instead of having one reusable red signal, it is suggested that each player receives four one-time-use red signals, and after each time a player uses these non-reusable signals, dealer keeps them instead of returning them to the player.

Conditions for Playing Signals:

Signals may be played with or without conditions. Conditions, if any, can be the same or different for different signals of different stacks or players. A group of conditions called "qualifying" conditions are conditions that make it possible to play certain signals. In other words a qualifying condition is necessary to be met so that a player can play a signal. For example a qualifying condition for playing the red signal can be that all chips of lower order stacks must have been wagered before or are being wagered at the time that the red signal is played.

Another group of conditions called "disqualifying" conditions are conditions that if met will make it impossible to play certain signals. For example, a disqualifying condition for playing the red signal can be that if the signal of a higher order stack has been already set to green, red signal cannot be played for a lower order stack.

Another group of conditions called "forcing" conditions are conditions that if happen, make it mandatory and not optional to play a signal. For example, a forcing condition for playing the red signal of a higher order stack can be playing the red signals of a lower order stack. This means that if a red signal is played for example for the stack number 2, the red signals of all (if any) higher order stacks like stack 3, 4, . . . must also be played at the same time.

Figure 6:
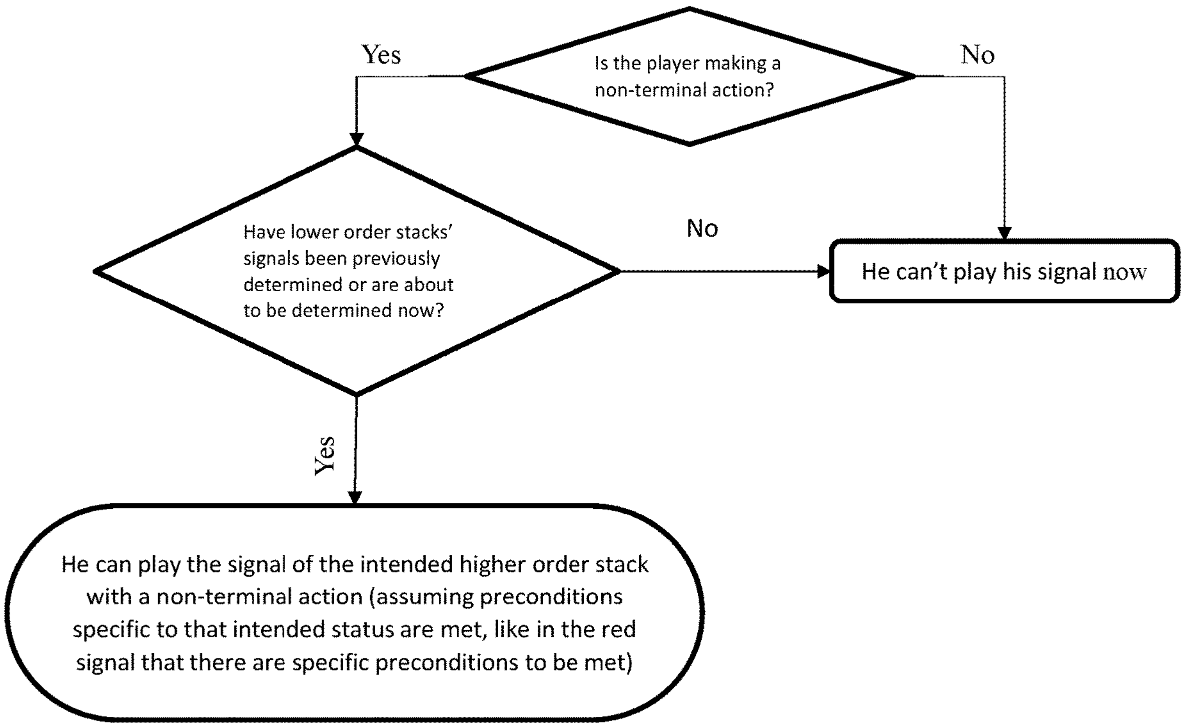
FIG. 6 is a flowchart diagram representing a method of using a signal during a poker game.

An example of a set of general preconditions of playing signals can be seen in the flow chart of FIG. 6. Signals associated with a specific stack (whether a green, red or others) in general can be played along with any nonterminal actions like check, call, bet, raise, (e.g. player plays "Red & Bet" or "Green & Raise"), as long as there will be some chips left in that particular stack at the end of the current action in which the signal is played. In other words, the signals of for example stack 2 cannot be played when the player is folding or going all-in or when no chips are going to be left in the stack 2 at the end of the current action. The reason for this condition is that signals are meant to control the possible future actions of a stack, now if a player is folding or using all the chips of a particular stack of his, it will be moot to try to play a signal to control a stack that is either empty or belongs to a player who has folded his hand. In summary a player can play a signal of a stack of his, if that stack has the potential to play a role in the rest of that hand. A previously completely wagered (empty) stack or a non-empty stack belonging to a player who has folded his hand simply cannot contribute any more wager in that hand and therefore the signals belonging to that stack cannot be played anymore in that hand.

Two Components of Each Action (Chip Action Followed by an Optional Signal Action)

In signal poker, a player action may consist of two different components: actions that are done with chips (the same actions seen in standard games of poker, which may be for example fold, check, call, bet, raise as in no limit Texas hold'em or pot limit Omaha games) and signal action, i.e. playing a signal, which may be optional or mandatory at different occasions. In the preferred embodiment of the signal action where the default signal is "white", the set of possible chip actions for a player in every hand at the beginning of a hand starts with all choices being available to the player. For example in a double stack no limit Texas hold'em signal poker, all standard actions of the standard (non-signal) Texas hold'em chip actions like fold, check, call, bet, raise, re-raise are initially available to all players, but as the hand progresses, depending on the possible choices of signal actions that a player may make, the set of the player's future possible chip actions in that hand may become limited to a subset of the original set of all possible actions.

Sequence for Performing the Components of an Action

There can be at least 3 sets of rules for the sequence in which a player can play his signal action as opposed to his standard action with chips (i.e. check, call, bet, and raise). The 3 sets of sequence rules can be implemented as follows:

1) No sequence rules. Any player can choose any sequence they wish, meaning that it is completely up to each player to choose if the player first makes his chip action and then his signal action or vice versa.
2) Chip action is performed first (chip action simultaneously or before the Signal action). The current Signal action affects the chip actions of that player only starting from the next time that action is on that player, and it has no immediate effect on the player's current chip action.
3) Signal action should be either performed or at least announced first (signal action simultaneously or before the chip action. This Variant is the preferred embodiment because it keeps the game running smoothly by preventing confusing scenarios in which player 1 makes the player's chip action and then player 2 quickly makes the player's action not knowing that the player 1 was still contemplating about an optional signal action. This set of rules can be implemented in the two following ways:
   - I) without a verbal declaration, an optional signal action should be performed either simultaneously or before the player makes his chip action.
   - II) with verbal declaration, the player makes a verbal announcement about his intended signal action at the same time or before his chip actions. At that point the player can perform the chip action and signal action in any sequence. For example the player can announce that he intends to play the Red signal for his stack number 2, then makes his chip action, and then plays his actual signal action which has to be what the player has announced (in this player's case playing the Red signal).

Occasion of Playing Signals

The occasion and the time for a player to play a signal can be implemented in different ways as follows:

I. Signal may be playable at all the times that the player makes a standard action with his chips like check, call, bet, raise, for example in a standard Texas hold'em poker game, standard actions happens in 4 stages/streets of action including preflop, flop, turn, and river, and hence in a Texas hold'em signal poker game, the signals may also be played in any of the aforementioned 4 streets of action as well, for example a player can play his green signal along with a bet on the flop, or as other examples, a player may play his red signal along with a call on the turn or play an orange signal with a raise on the river.

II. Signal may be playable at some, but not all of the streets of actions, for example a signal poker game variety can be such that players can play their signal on the turn and river, but not on the flop or preflop. This means that some streets of action can be specific to action with chips, while other streets of action can be used for both signal play and chips play.

III. Signal may be playable at newly defined streets of actions which may be usable for playing both signals and chips, or they may be specific to playing signals, for example a new street of action can be defined in between the flop and the turn and in this new street only signals and not chips can be played.

Different rules can be adopted in terms of the signals effectiveness starting moment. When a player plays a signal, the effect of that signal can be realized at different times. The signals can take effect instantly, at the beginning of the next round of action, or the beginning of the next street of action after being played.

Double Signal Double Stack Game (Using Red and Green Signals)

In the double signal game, the default mode is indicated by the absence of any signal in front of the player in live games, while in online games, the indicator may actually have three different statuses including the white/default mode. Therefore in the double signal in live games, white/default is not considered a signal or a status, but rather an absence of any signal or status. Two signals, designated hereafter as "Red" and "Green," may be implemented in the aforementioned double signal game, and are described in detail below.

Playing Red

Figure 7A:
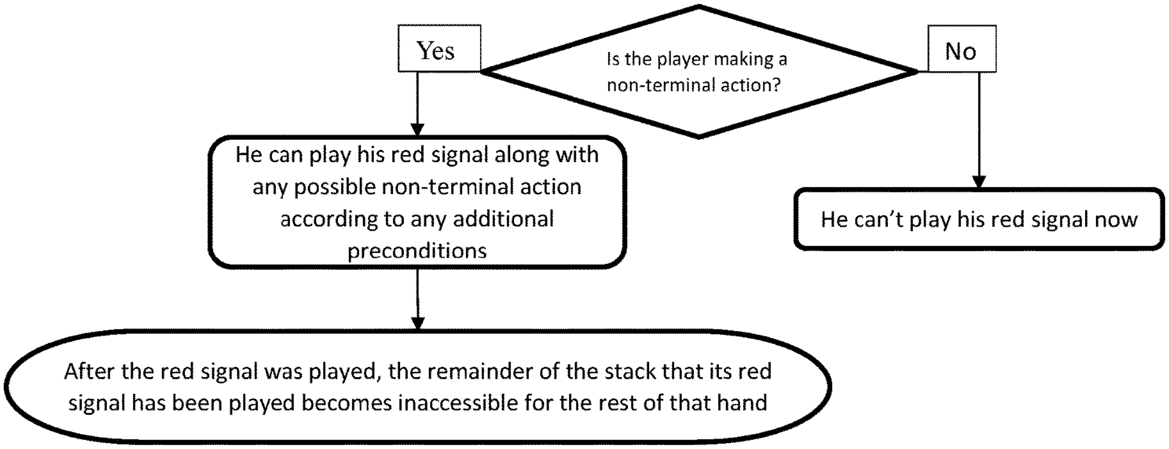
FIGS. 7A and 7B are two flowchart diagrams representing an alternate methods of using a signal during a poker game.
Figure 7B:
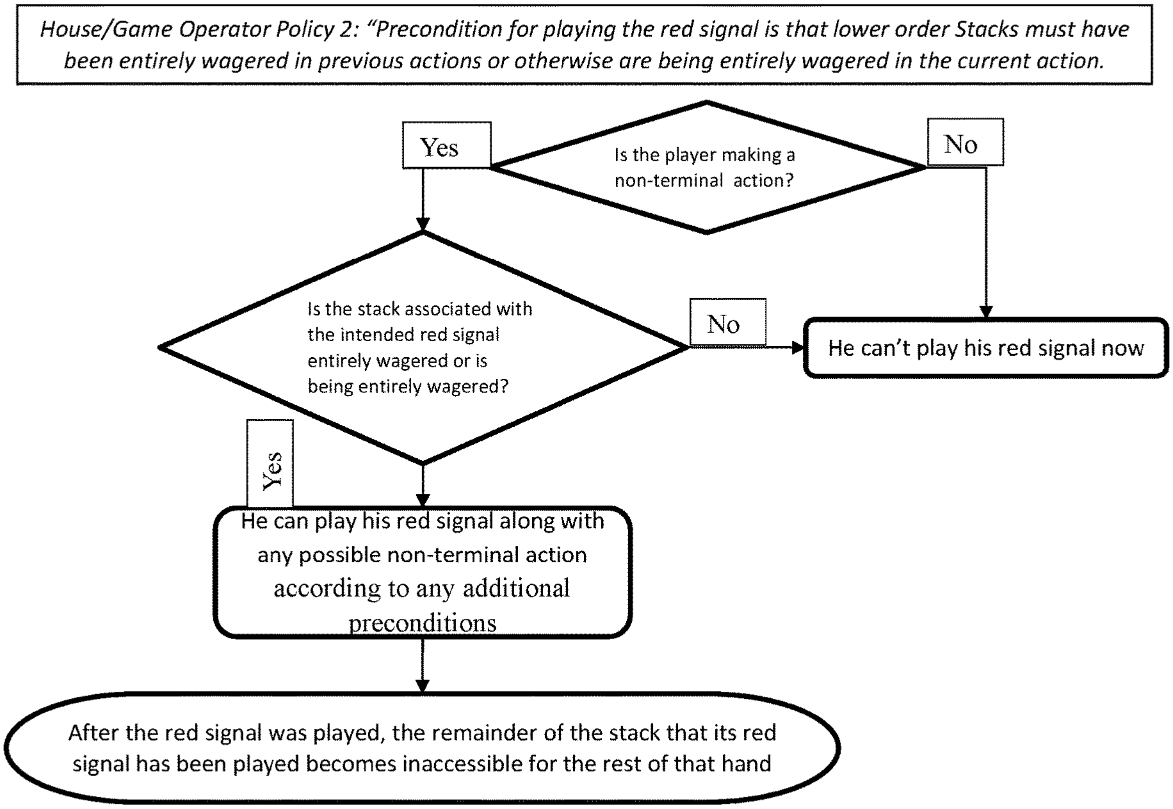

A general flow chart describing how a player can play red can be seen in FIGS. 7A and 7B. Red is a terminal signal, meaning that once the Red side of signal is faced up by a player, the player cannot change it for the rest of that hand. The standard way of playing Red is described in the flowcharts of FIGS. 7A and 7B and further explained below. In a standard base game with no add-ons, playing Red is optional. When a player faces a bet and does not want to fold and intends to turn the signal of the player's stack to Red, and possible preconditions for using red signal are met, the player must either make a complete call or raise during the player's current chip action and only in that case the player will have the option to play Red in the player's current signal action. There may be additional preconditions, for example the red signal can be played with bet and raise, but not with call or check, and there may be additional conditions on the required size of the bet or raise in order for the signal to be playable.

In one embodiment of multi stack signal poker, red signal can be played for a stack only when all the possible lower order stacks have either been already wagered in previous actions or are about to be wagered during the current action by the player. For example, in a double stack game, the player can play the player's red signal of his second stack only if he has either previously exhausted all the chips of his first stack or is exhausting them in his current wagering action. In this embodiment, the player cannot play Red for his second stack and then after the end of his current action still have chips left in his first stack.

In the alternative format of playing the Red, the Red signal can be played with no precondition, as shown in FIG. 7A, or with conditions other than those specified above.

In the preferred embodiment, when a player plays a Red Signal for one of his stacks, it means that the associated stack with that signal will simply become "out of the play" for the rest of that hand, as if that stack no longer exists.

"Call for Less" Option

If call for less is allowed by a game operator, for players the use of "call for less" is optional and not mandatory, however if the player chooses to use "call for less", then turning the signal to Red will be mandatory and not optional. When a player faces a bet and the player doesn't want to fold, and in the player's primary stack the player doesn't have enough chips to make a (complete) call, i.e. the player's primary stack is not enough to match the size of the bet, if this player wants to turn signal of the player's second stack to Red, the player can do it in one of two ways: either by making a raise or complete call (for a complete call the player will need to use some chips from the player's second stack as the player's first stack did not have enough chip to match the bet), or the player can make an incomplete call with whatever chips the player has in the his primary stack which makes the player's action essentially a "call for less" or like an all-in with only the player's primary stack while the player will still have chips left in his second stack after the end of the player's action. If the player chooses the latter option, the "Call for less" option, the player will be required to turn the signal of his higher order stack to Red which makes that stack out of the game and unusable for the rest of that hand.

The "call for less" may also be allowed in a "free range" format, hence named "free range call for less", meaning that for example if a player faced an $80 bet and he has only $50 in his first stack and $200 in his second stack and he intended to play the red signal on his second stack, not only can the player call for less with only the $50 in the first stack, but he can choose any other size for the player's wagered contribution, for example the player may choose to call $54, with $50 from stack 1 and $4 from stack 2, or the player may choose to call $79 with $50 from stack 1 and $29 from the stack 2 or the player may call the whole $80 bet too which then will be a complete call.

"Stay" Option

If "stay" is allowed by a game operator, for players, the use of the "stay" is optional and not mandatory, but if "stay" is chosen by a player, then turning the signal to Red will be mandatory and not optional. "Stay" may be considered as a specially case of a "call for less" with zero chips contribution. A player who already meets any precondition of playing the red signal, and is facing a bet, but doesn't want to contribute any more chips to the pot, has the option to announce "stay" which means the player's cards remain live in that hand without the player needing to contribute any more chips to the pot, but all the player's higher order stacks will be required to turn to Red signal.

How to Play "Green" Signal?

Figure 8:
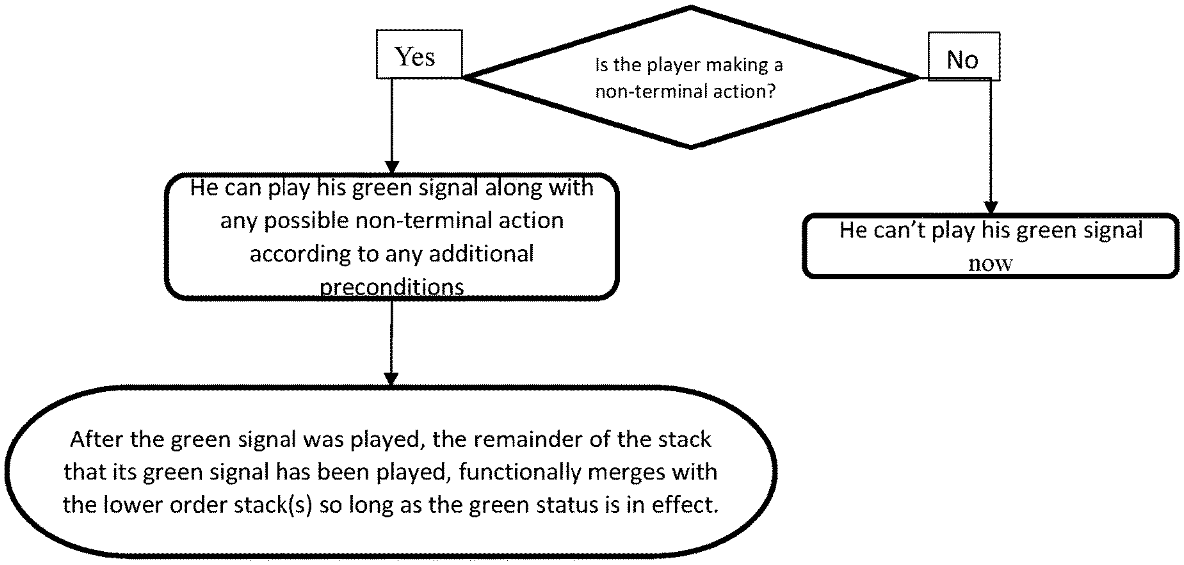
FIG. 8 is a flowchart diagram representing an alternate method of using a signal during a poker game.

A general flowchart explaining how a player can play the green signal can be seen in FIG. 8. While in a double signal game Green is best to adopted as a terminal signal as it cannot turn to the Red (Red being the only other status in a double signal game other than Green), in general Green is best to be considered non-terminal, as for example in a six-signal game, green can be turned to at least some statuses (like Yellow or Black), but not to others (like Red, Orange, or White).

Precondition for playing Green: In the preferred game mode no specific condition has to be met for playing green, in non-preferred modes, green may be played with different preconditions.

Consequence of playing Green: When a player plays/sets Green Signal for one of the player's stacks, (in a signal game where signals are associated with individual stacks), for example the player's stack number 2, it means that as long as the signal is green, the stack associated with that signal (in this case the player's 2nd stack) will function no different than the player's lower order stack (in this player's case the player's primary stack). This player's essentially makes the player's primary stack and 2nd stack serve as one big merged stack with all the rules applying to the primary stack to be applied to the functionally combined/merged stack in spite of the fact that the two stacks still remain visually distinct. Another way to interpret the effect of the green signal is that playing green essentially precluded playing red.

Playing Green and the "Lock Buster" Option

The standard way of playing Green is described in the flowchart of FIG. 8 and further explained below. Playing Green is optional in a standard game. If the "lock buster" option is adopted by the game operator in the format of the game, then once a player performs a "lock buster action" with the chips of any stack of the player's, the player must set the signal of that stack to Green. For the purpose of defining a "lock buster action", the operator of the game can adopt any of the following 7 choices of actions that can be done with any chip of a stack: in any action, in a call action, in a bet action, in a raise action, in a call or bet action, in a call or raise action, and in a bet or raise action.

Combinations of the 3 Optional Features:

None, one, any two or all three of the 3 optional features (add-on's) of "Call for less", "Stay", and "Lock Buster" can be adopted and allowed by the operator of the game in a format which creates the following 8 possible game formats:

I) Standard game with no added optional feature (preferred embodiment)

II) Lock Buster game(s)

III) Lock Buster+Stay game(s)

IV) Lock Buster+Stay+"Call for less" game(s)

V) Lock Buster+"Call for less" game(s)

VI) Stay game

VII) Stay+"Call for less" game

VIII) "Call for less" game

As discussed before, lock buster itself can be implemented in 7 ways, that is why in the above 8 formats whenever lock buster is present we have game(s) and not game. Because formats II, III, IV, and V each expand to 7 kinds of lock busters, total number of formats can be 32 formats.

An Example of a Six Signal Game

Figure 11:
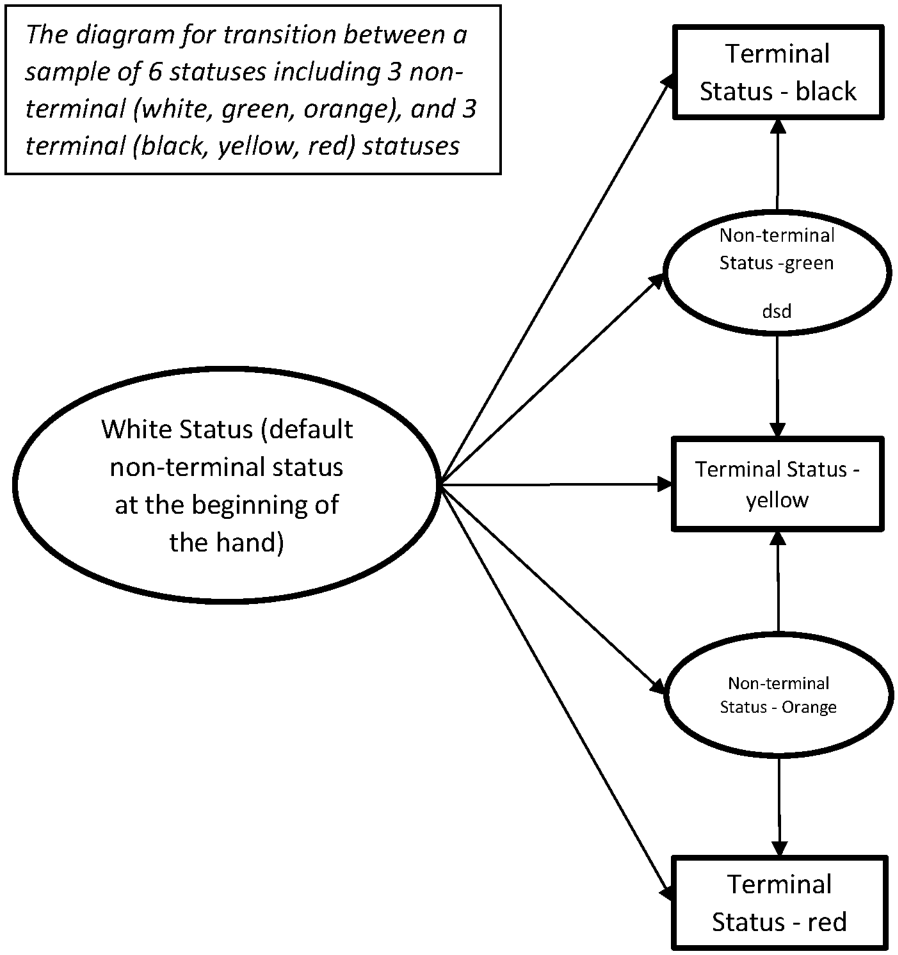
FIG. 11 is a flowchart diagram representing a method of using a signal during a poker game.

As a more advanced example of signal poker, one embodiment of a game with six signals in which six signals of White (default), Red, Green, and three additional signals Yellow, Orange, and Black are adopted is shown in the flowchart in FIG. 11. This embodiment uses a 6 sided cube as a signal object, similar to FIG. 4 with each signal mode being represented on a side of the cube by color coding, verbal explanation, or other differentiating means. A sample of the physical appearances of the front (left hand side) and back (right hand side) of different signals can be viewed in FIG. 14. While the following signals are displayed for stack number 2, similar designs can be used for any other stack.

Playing Yellow

Figure 9:
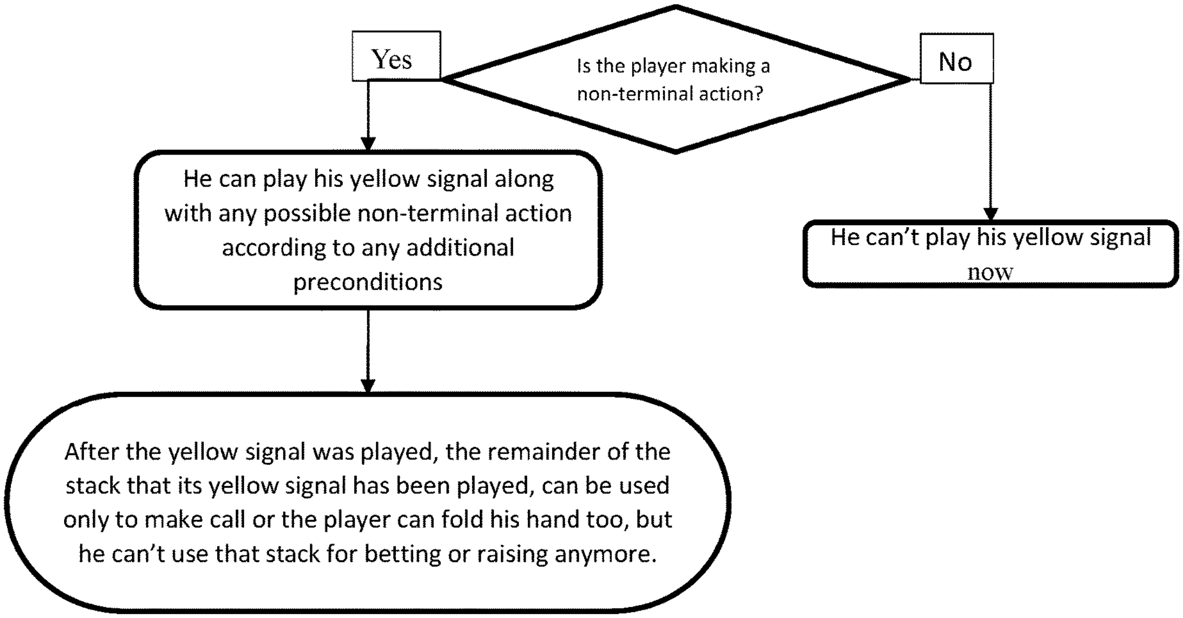
FIG. 9 is a flowchart diagram representing an alternate method of using a signal during a poker game.

The standard way of playing Yellow is described in the flowchart of FIG. 9 and further explained below. Yellow can be a terminal Status meaning that once Yellow side of signal is faced up it cannot change. When a player plays a yellow signal as described in the flow chart in FIG. 9, for one of the player's stacks, it means that for the rest of that hand the associated stack with that signal can be used only to make call or the player can check or fold the player's hand too, but the player cannot use that stack for betting or raising anymore. Playing Yellow makes a stack "passive & unlockable" as only passive actions (fold and call) remain available and locking the stack (turning to Red) is not an option.

Playing Orange

Figure 10:
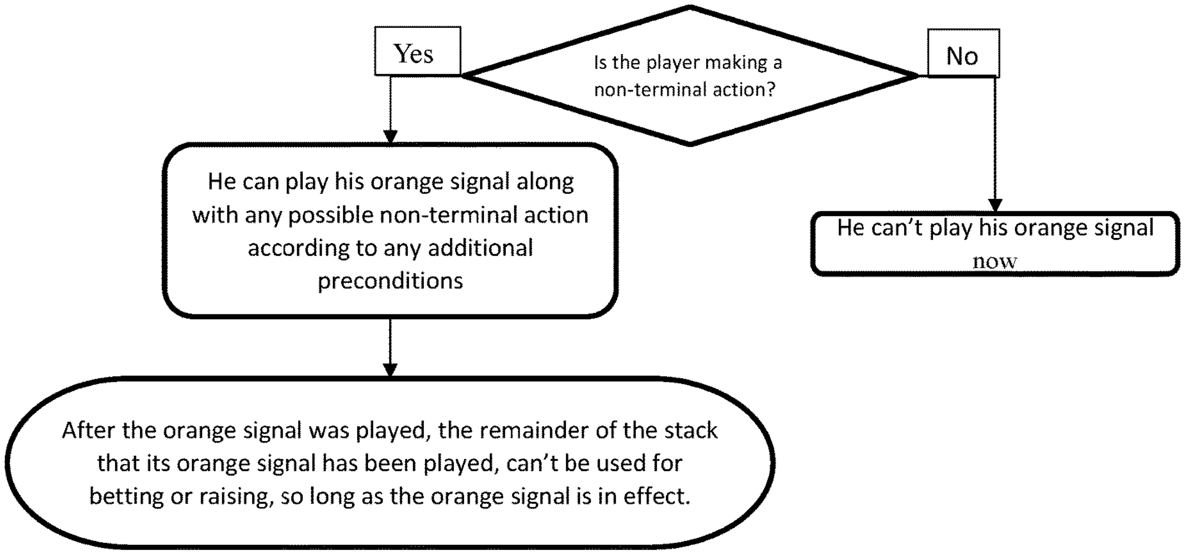
FIG. 10 is a flowchart diagram representing an alternate method of using a signal during a poker game.

The standard way of playing Orange is described in the flowchart of FIG. 10 and further explained below. Orange is a non-terminal Status, once a signal is faced up Orange it can either stay Orange or switch to either Red or Yellow. When a player plays an Orange Signal for one of the player's stacks, it means that for the rest of that hand, the signal of that stack can either stay Orange or it can also turn to a limited subset of other signals like Red or Yellow. In a stack with Orange signal, betting or raising with that stack is not an option. Playing Orange makes a stack "passive & lockable" as passive actions (fold and call) remain available but locking the stack (turning Yellow to Red) also remains an option.

Playing Black

Figure 12:
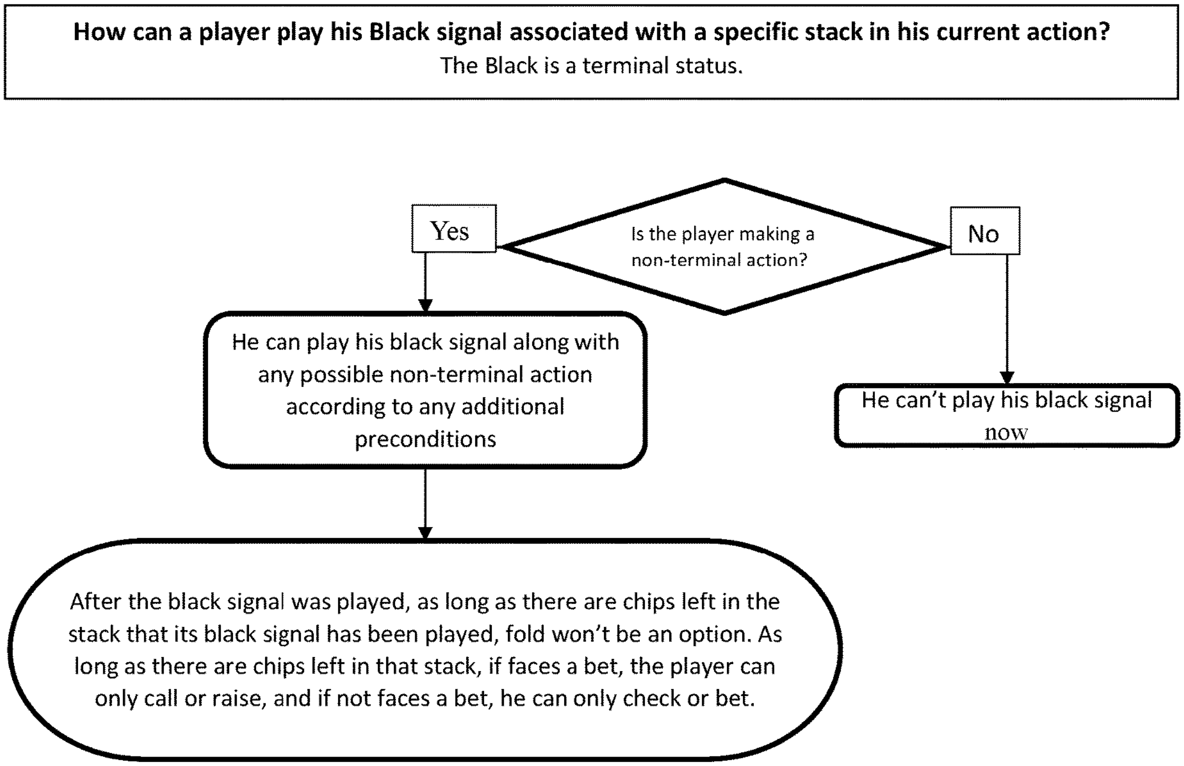
FIG. 12 is a flowchart diagram representing an alternate method of using a signal during a poker game.

The standard way of playing Black is described in the flowchart of FIG. 12 and further explained below. Black can be a terminal Status meaning that once the Black signal was played, it cannot change. When a player plays Black, it means that while the player is able to bet or raise with that stack, fold is no longer an option to the player so long as there are chips left in that stack. Moreover, if the player ever faces a bet it is mandatory for the player to at least call the bet with that stack, meaning that he can either call or raise. In the preferred game mode, the mandatory call applies only to that stack with Black signal, but not to the higher order stacks which do not have black signal. For example, if the value of chips in the player's stack with black signal is less than the size of the bet, but the player has chips left in the player's other stacks, the player may be given two possible options to choose from:

1. Make the complete call using chips from all the player's stacks or go all in if the player has less than the bet size in all the player's stacks combined
2. If the player's higher order stacks have been previously set to the Red the player may call for less with all the money in the black stack without using chips from the player's higher order Red signal stacks.

Playing black makes a stack "aggressive & exposed" as the most passive action, fold, is no longer an option, and the player has committed his black stack to be exposed/unprotected, as the player will have to make at least a call if the player ever faces a bet.

Signal and Stack Management Rules in Multi-Stack Signal Poker Games

The ordered stack method is described in the flowchart of FIG. 13 and further described in this specification. A specific stack has to be designated as the primary, another stack to be the secondary, and so on. Structurally, primary stacks are intended to be more actively involved in the game than stack 2 and similarly the 3rd stack will be less active (more protected, or less vulnerable) than stacks 1 and 2. If stacks are ordered, some rules may be adopted to smooth and manage the interaction between the signals of different ordered stacks, such as:

I) Signals of a lower order stacks must be played before or at least at the same time as the signals of higher order stacks are played. For example, a player has to decide the signal of the player's 3rd stack before or at the same time that the player decides the status of the player's 2nd stack.

II) Higher order stacks to have more protection than lower order stacks: Given that some non-default signals provide more freedom (less limitations) to the player than others, it is suggested that in the preferred embodiment of the game, the set of actions available on lower order stacks to be less limited than the set of options available for the higher order stacks. So for example if a lower order stack, stack number 3 is ever turned to the Red status, given that the Red induces the most limited and protected and least vulnerable status (since Red makes the stack totally unusable) all the higher order stacks (in this case stacks 4, 5 and higher) should automatically turn to Red as well so that higher order stacks cannot be more vulnerable than lower stacks.

Order of Using Chips from Different Stacks

When using chips from different stacks, there are a number of methods that may be implemented. The following are some examples of such methods:

Alternative I) no rule: a player who is going to use $80 of the player's chips for a bet, call, or raise, can provide that $80 from any combination of the player's different stacks as the player wishes, for instance the player may choose to bring $30 from stack 1, $5 from stack 2, zero from stack 3, and $45 from stack 4

II) Lower stack first: a player can use the player's chips from higher order stacks only after the lower order stacks have been already exhausted.

III) Higher stack first: a player can use the player's chips from lower order stacks only after the higher order stacks have been already exhausted.

IV) Predefined contribution: a player should use a predefined formula of using the player's stacks, for example players may be required to use equal amount of contributions from their different stacks, or they may have to use their stack 1 and 2 at a 60%-40% ratio.

Rules of Conversion from Lower Order to Higher Order Stacks:

When converting stacks from lower order to higher order, the operator of the game may implement a number of rules dictating such conversions. One method is to prohibit the conversions altogether. Another method may be, for example, to specify conversion rules if the size of the lower order stack or the ratio of lower order to higher order stacks ever exceeded a threshold, the player can request that the dealer convert some of the player's lower order stack to higher order stack. Such conversion can be done either for a certain amount of chips or percentage of lower stack or to bring the ratio of stacks to a specific ratio or within a range of admissible ratios.

Rules of Conversion from Higher Order to Lower Order Stacks:

When converting stacks from lower order to higher order, the operator of the game may implement a number of rules dictating such conversions. One method may be to always allow conversion from higher order to lower order stacks upon player request. Another may be to institute mandatory conversions enforced by the dealer to prevent absence of money on lower order stacks and an overabundance of money on higher order stacks. For example, if a player loses all the player's chips in the primary stack and the player is unable or unwilling to rebuy more chips for the player's primary stack, but still has chips left in the player's second stack, then dealer can perform a mandatory conversion from the player's second stack to the primary stack to bring the size of the player's primary stack up from zero to the lesser of the min-buy in or the total size of chips player has left. An alternative method may be to disallow any conversions.

When instituting mandatory conversions, the operator of the game may use some or all of the following methods:

I) If the ratio of a higher order stack to a lower order stack exceeded a threshold at the end of a hand, dealer coverts a certain amount or percentage of the higher order stack to the lower order stack.

II) If the size of primary stack at the end of a hand (or at the end of each level in tournaments) ever fell below a certain number of big blinds (e.g. primary stack of a player fell below 20 big blinds), dealer converts enough of the higher order stacks of that player to bring the size of the player's primary stack up to the lesser of a required number of big blinds or the total size of chips player has left.

III) If a pot is about to be won by a player with a hand stronger than a predetermined threshold (e.g. pots won with flush or better or alternatively pots won with four of a kind or better), then dealer should convert all the chips in the pot that have come from different players' higher order stacks to the type of chips that are used in lower order stacks and then give the pot to the winner.

Rules Specific to Tournaments:

In tournaments, either based on the choice of each individual player or based on the choice of the tournament director players may play in any of the following formats:

I) Starting the game with an entire single stack or with all their multiple stacks at the beginning (start with stack 1, 2, 3 . . . ). II) A certain percentage of each of their stacks is given to them at the beginning and the rest be given to them in one or more later stages.

III) A certain amount of their single stack or a certain number of their multiple stacks is given to them and the other stacks are given to them in one or more later stage. This method may involve a time delay, with player receiving their stacks at specified times after play has begun (i.e. stacks 1 and 2 are given to the players at the beginning, stack 3 is given half an hour later, and stack 4 is given an hour later).

IV) For a certain period of time the tournament may be played with certain optional features, number of stacks, and or signals, and for another period the game may continue with some other parameters, for example with merger or split in stacks or with added or removed signals.

V) The number of times a player is entitled to play the player's button may be decided to be limited, for example instead of having a signal button that a player can use in an unlimited number of hands, the game operator may give each player a finite number of some signals and each time a player uses one of the player's limited number of signals, dealers are supposed to take away those used signals at the end of the hand and do not return them to the players. Alternatively played signals may be given by the dealer to the winner(s) of the hand. The usage limit can be applied to all signals, or it can be applied to only certain signals, or it can be a limit per period of time or for the rest of the tournament.

Gaming Machine

An additional embodiment of the present invention is a gaming machine comprising a housing and computing components such as a microprocessor, memory, storage, an electronic display and external connectivity such as, but not limited to Wi-Fi, Ethernet, or cellular modem connectivity and an input controller such as a touch screen or physical buttons. One embodiment of the gaming machine may be configured to use the external connectivity to play peer-to-peer, internal network, or internet or online games. The gaming machine is configured to receive a physical input from a player to initiate the card-based wagering game and transform the input into an electronic data signal. The electronic data signal is processed by a software component configured to return a randomly generated hand to the display as well as randomly generated hands of additional networked players, or artificial players. The player then may use the input controller to send the input to another electronic data signal to be processed by the software component additionally configured to divide the player's total number of credits or chips into stacks and return the stack configuration data to the display for the player, artificial players, or networked players to view. The player then may use the input controller to play signals according to the rules mentioned above. When a player uses the input controller to play the signals, an electronic data signal is sent through the input controller to the software component additionally configured to interpret the signal selection and return the signal selection to the display for the player, artificial players, or networked players to view. The electronic data signal resulting from a player playing a signal will be processed by the processor, such that the future actions of that player may be affected and limited by the rules associated with the played signal.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed:

1. A method of playing poker comprising the steps of:

a) arranging all players' poker chips into at least one grouping of chips;

b) dealing a hand of cards to all players;

c) a player using a multifaceted signal device to send at least one of a plurality of discrete signals, to all other players and or a dealer, the at least one signal of the plurality of discrete signals, representing a wager action limitation that the player will be confined to when making a wager action from the at least one grouping of chips during a dealt hand; and wherein a number of facets of the multifaceted signal device is equal to a number of grouping of chips and further wherein a facet of the multifaceted signal device indicates the number of stacks of chips available to wager for the player who displays the facet during the dealt hand.

2. The method of claim 1, wherein the step of using the signal device includes sending a signal of the plurality of discrete signals representing at least one of the following wager action limitations:

a) a grouping of chips is out of play;

b) a grouping of chips is in play and cannot be made out of play;

c) a grouping of chips is usable only for a call action and cannot be used for a bet or a raise action;

d) the player commits not fold the dealt hand;

e) the player commits not to check;

f) the stack of chips is usable only for a call or a raise, but unusable for betting;

g) the stack of chips is usable only for a call or a bet, but unusable for raising;

h) the player commits to bet if the wager action is checked to the player, or raise if the player faces a bet;

i) the player commits to only bet or raise;

j) the player commits to use a grouping only for betting;

k) the player commits to use a grouping only for raising;

l) a default mode before any other signal is played signifying that all actions are still possible using a grouping;

m) the player remains in the dealt hand by wagering less than a current table wager and without making any additional wagers throughout a remainder of the dealt hand;

n) the player blocks at least one additional player from playing a wager action or at least one signal; and o) the player cancels at least one wager action limitation from at least one additional player.

3. The method of claim 1 wherein a set of conditions for signaling the wager action limitation comprises at least one of the following:

a) no conditions, wherein some or all signals can be played without any condition;

b) qualifying conditions, wherein a condition must be met in order for a player to signal the wager action limitation;

c) disqualifying conditions, wherein at least one condition exists that disqualifies a player from signaling the wager action limitation; and d) forcing conditions, wherein at least one condition exists such that a player must play the wager action limitation.

4. The method of claim 1, wherein a frequency with which the wager action limitation may be played comprises at least one of the following:

a) unlimited or reusable, wherein the player may use the wager action limitation or additional wager action limitations without limitation; and b) limited, wherein a player is limited to the use of the wager action limitation or additional wager action limitations.

5. The method of claim 1, wherein the plurality of discrete signals further represent the wager action limitation for at least one of the following:

a) a single grouping of a single player;

b) all groupings of a single player;

c) a grouping of all players; and d) all groupings of all players.

6. The method of claim 1, wherein the wager action limitation is further defined as terminal such that once the wager action limitation has been signaled, the wager action limitation cannot be changed; or the wager action limitation is further defined as non-terminal such that once the wager action limitation has been signaled, the wager action limitation may be changed to at least one new wager action limitation.

7. The method of claim 1, wherein the method further comprises using a gaming machine system primarily dedicated to playing a card-based wagering game, the gaming machine further comprising:

a power supply, a housing, a microprocessor, memory, storage, a networking means configured to communicate to the Internet or an additional signal device, a display, and an electronic input device;

the electronic input device configured to receive a physical input from a player to initiate a card-based wagering game and transform the input into an electronic data signal;

a software component configured to interpret the electronic data signal and return randomly generated poker hands to the display for each player;

the electronic input device additionally configured to receive the physical input from a player to divide a player's chips into a determined number of stacks of and transform the input into a second electronic data signal;

the software component additionally configured to interpret the second electronic data signal and return a visual indicator displaying the number of stacks and the determined chip values to the display for each player;

the electronic input device additionally configured to receive a physical input from a player to select a visual signal for each stack that determines a wager action limitation for the player and transform the input into a third electronic data signal; and the software component additionally configured to interpret the third electronic data signal and return the visual indicator displaying the visual signal for each stack that determines a wager action for the player to the display for each player.

8. A method of playing poker comprising the steps of:

a) arranging all players' poker chips into at least one stack two groupings of chips wherein each grouping of chips operate under separate and distinctive wager action limitations;

b) dealing a hand of cards to all players;

c) a player using a signal device, to send at least one of a plurality of discrete signals, to all other players and or a dealer, representing a wager action limitation for at least one of the two groupings that the player will be confined to when making a wager action from the at least one stack two groupings of chips during a dealt hand; and wherein the signal device comprises a power source, a housing, a multicolored LED or a multi-status indicator, and a switch configured to change a color of the multicolored LED or a status of the multi-status indicator, further wherein each color of the multicolor LED, or each status of the multi-status indicator represent one of the plurality of discrete signal; and wherein a separate set of signals is used for each of the at least two groupings.

9. The method of claim 8, wherein the method further comprises using a gaming machine system primarily dedicated to playing a card-based wagering game, the gaming machine further comprising:

a power supply, a housing, a microprocessor, memory, storage, a networking means configured to communicate to the Internet or an additional signal device, a display, and an electronic input device;

the electronic input device configured to receive a physical input from a player to initiate a card-based wagering game and transform the input into an electronic data signal;

a software component configured to interpret the electronic data signal and return randomly generated poker hands to the display for each player;

the electronic input device additionally configured to receive the physical input from a player to divide a player's chips into a determined number of stacks of and transform the input into a second electronic data signal;

the software component additionally configured to interpret the second electronic data signal and return a visual indicator displaying the number of stacks and the determined chip values to the display for each player;

the electronic input device additionally configured to receive a physical input from a player to select a visual signal for each stack that determines a wager action limitation for the player and transform the input into a third electronic data signal; and the software component additionally configured to interpret the third electronic data signal and return the visual indicator displaying the visual signal for each stack that determines a wager action for the player to the display for each player.

10. The method of claim 8, wherein the step of using the signal device includes sending a signal of the plurality of discrete signals representing at least one of the following wager action limitations:

a) a grouping of chips is out of play;
b) a grouping of chips is in play and cannot be made out of play;
c) a grouping of chips is usable only for a call action and cannot be used for a bet or a raise action;
d) the player commits not fold the dealt hand;
e) the player commits not to check;
f) the stack of chips is usable only for a call or a raise, but unusable for betting;
g) the stack of chips is usable only for a call or a bet, but unusable for raising;
h) the player commits to bet if the wager action is checked to the player, or raise if the player faces a bet;
i) the player commits to only bet or raise;
j) the player commits to use a grouping only for betting;
k) the player commits to use a grouping only for raising;
p) a default mode before any other signal is played signifying that all actions are still possible using a grouping;
q) the player remains in the dealt hand by wagering less than a current table wager and without making any additional wagers throughout a remainder of the dealt hand;
r) the player blocks at least one additional player from playing a wager action or at least one signal; and
s) the player cancels at least one wager action limitation from at least one additional player.

11. The method of claim 8 wherein a set of conditions for signaling the wager action limitation comprises at least one of the following:

a) no conditions, wherein some or all signals can be played without any condition;
b) qualifying conditions, wherein a condition must be met in order for a player to signal the wager action limitation;
c) disqualifying conditions, wherein at least one condition exists that disqualifies a player from signaling the wager action limitation; and
d) forcing conditions, wherein at least one condition exists such that a player must play the wager action limitation.

12. The method of claim 8, wherein a frequency with which the wager action limitation may be played comprises at least one of the following:

a) unlimited or reusable, wherein the player may use the wager action limitation or additional wager action limitations without limitation; and
b) limited, wherein a player is limited to the use of the wager action limitation or additional wager action limitations.

13. The method of claim 8, wherein the plurality of discrete signals further represent the wager action limitation for at least one of the following:

a) a single grouping of a single player;
b) all groupings of a single player;
c) a grouping of all players; and
d) all groupings of all players.

14. A method of playing poker comprising the steps of:

a) arranging all players' poker chips into at least one stack two groupings of chips wherein each grouping of chips operate under separate and distinctive wager action limitations;
b) dealing a hand of cards to all players;
c) a player using a signal device, to send at least one of a plurality of discrete signals, to all other players and or a dealer, representing a wager action limitation for at least one of the two groupings that the player will be confined to when making a wager action from the at least one stack two groupings of chips during a dealt hand; and wherein the signal device is a multifaceted object, further wherein a facet of the multifaceted object represents one of the plurality of discrete signals and wherein a separate signal device is used for each grouping of each player.

15. The method of claim 14, wherein the method further comprises using a gaming machine system primarily dedicated to playing a card-based wagering game, the gaming machine further comprising:

a power supply, a housing, a microprocessor, memory, storage, a networking means configured to communicate to the Internet or an additional signal device, a display, and an electronic input device;

the electronic input device configured to receive a physical input from a player to initiate a card-based wagering game and transform the input into an electronic data signal;

a software component configured to interpret the electronic data signal and return randomly generated poker hands to the display for each player;

the electronic input device additionally configured to receive the physical input from a player to divide a player's chips into a determined number of stacks of and transform the input into a second electronic data signal;

the software component additionally configured to interpret the second electronic data signal and return a visual indicator displaying the number of stacks and the determined chip values to the display for each player;

the electronic input device additionally configured to receive a physical input from a player to select a visual signal for each stack that determines a wager action limitation for the player and transform the input into a third electronic data signal; and the software component additionally configured to interpret the third electronic data signal and return the visual indicator displaying the visual signal for each stack that determines a wager action for the player to the display for each player.

16. The method of claim 14, wherein the step of using the signal device includes sending a signal of the plurality of discrete signals representing at least one of the following wager action limitations:

a) a grouping of chips is out of play;

b) a grouping of chips is in play and cannot be made out of play;

c) a grouping of chips is usable only for a call action and cannot be used for a bet or a raise action;

d) the player commits not fold the dealt hand;

e) the player commits not to check;

f) the stack of chips is usable only for a call or a raise, but unusable for betting;

g) the stack of chips is usable only for a call or a bet, but unusable for raising;

h) the player commits to bet if the wager action is checked to the player, or raise if the player faces a bet;

i) the player commits to only bet or raise;

j) the player commits to use a grouping only for betting;

k) the player commits to use a grouping only for raising;

t) a default mode before any other signal is played signifying that all actions are still possible using a grouping;

u) the player remains in the dealt hand by wagering less than a current table wager and without making any additional wagers throughout a remainder of the dealt hand;

v) the player blocks at least one additional player from playing a wager action or at least one signal; and w) the player cancels at least one wager action limitation from at least one additional player.

17. The method of claim 14 wherein a set of conditions for signaling the wager action limitation comprises at least one of the following:

a) no conditions, wherein some or all signals can be played without any condition;

b) qualifying conditions, wherein a condition must be met in order for a player to signal the wager action limitation;

c) disqualifying conditions, wherein at least one condition exists that disqualifies a player from signaling the wager action limitation; and d) forcing conditions, wherein at least one condition exists such that a player must play the wager action limitation.

18. The method of claim 14, wherein a frequency with which the wager action limitation may be played comprises at least one of the following:

a) unlimited or reusable, wherein the player may use the wager action limitation or additional wager action limitations without limitation; and b) limited, wherein a player is limited to the use of the wager action limitation or additional wager action limitations.

19. The method of claim 14, wherein the plurality of discrete signals further represent the wager action limitation for at least one of the following:

a) a single grouping of a single player;

b) all groupings of a single player;

c) a grouping of all players; and d) all groupings of all players.

* * * * *